United States Patent [19]

Rakauskas

[11] Patent Number: 5,276,973
[45] Date of Patent: Jan. 11, 1994

[54] COMBINATION SQUARE, HEIGHT/WIDTH GAGE

[75] Inventor: Vitie Rakauskas, Shrewsbury, Mass.

[73] Assignee: C & K Components, Inc., Newton, Mass.

[21] Appl. No.: 993,529

[22] Filed: Dec. 10, 1992

Related U.S. Application Data

[63] Continuation of Ser. No. 841,571, Feb. 26, 1992, abandoned.

[51] Int. Cl.⁵ ............................................... B43L 7/00
[52] U.S. Cl. ........................................ 33/427; 33/464
[58] Field of Search ................. 33/427, 428, 464, 626, 33/633, 634, 640, 810-812, 832, 838

[56] References Cited

U.S. PATENT DOCUMENTS

| | | | |
|---|---|---|---|
| 1,379,253 | 5/1921 | Dorney | 33/427 |
| 2,085,461 | 6/1937 | Chafee | 33/428 |
| 2,122,875 | 7/1938 | Witchger | 33/427 |
| 2,246,066 | 6/1941 | Rothe | 33/427 X |
| 2,797,491 | 7/1957 | Asperger | 33/427 |

Primary Examiner—William A. Cuchlinski, Jr.
Assistant Examiner—Alvin Wirthlin

[57] ABSTRACT

This is a height/width gage element for use with an adjustable square; the square has a head portion which is slidable engaged to a base and the base is a straight edge having a side surface with a first engagement slot formed on the side surface extending longitudinally thereon, the height/width gage element has a lower side with a front side edge and a first angle side extending from the back side edge, when the head portion and the height/width gage element are slid together along the base portion, the first angle side and lower side of the height/width gage element abut the angle side and the bottom side of the head portion.

1 Claim, 2 Drawing Sheets

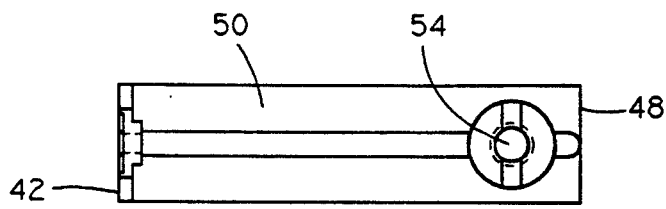
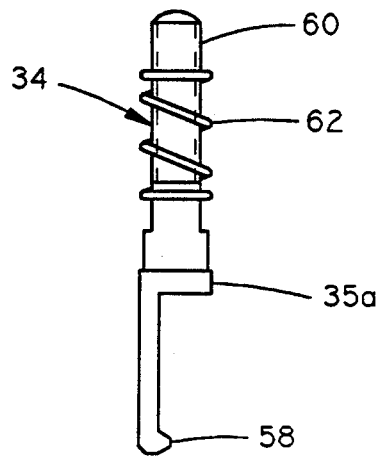
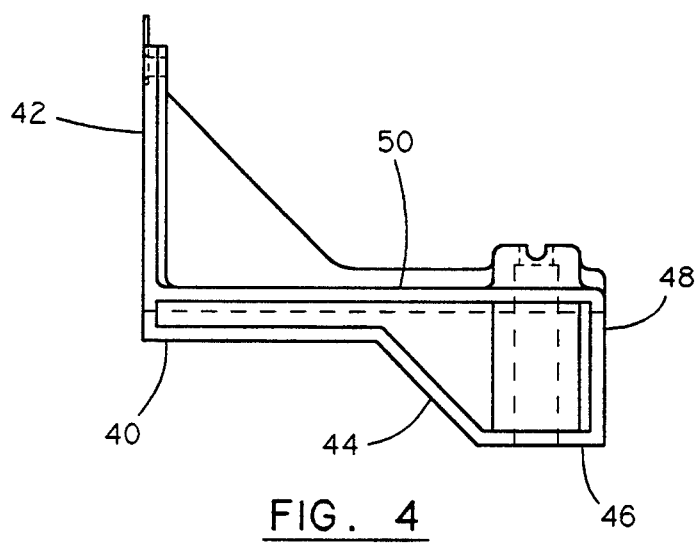
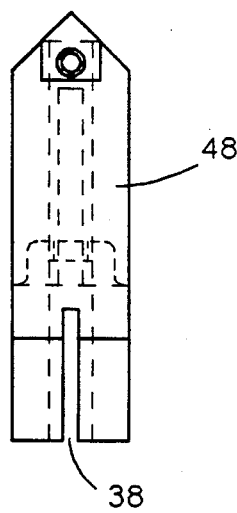
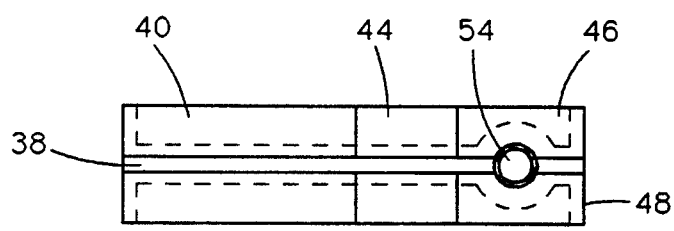
FIG. 7
FIG. 3
FIG. 4
FIG. 6
FIG. 5

COMBINATION SQUARE, HEIGHT/WIDTH GAGE

This is a continuation of co-pending application Ser. No. 07/841,571 filed on Feb. 26, 1992 now abandoned.

BACKGROUND OF THE INVENTION

Field of the Invention

This invention relates to gages and more specifically to a combination square height/width gage.

SUMMARY OF THE INVENTION

The invention disclosed herein is directed at a combination square height/width gage comprising a square head, a base and a height/width gage element. The base is a ruler having two long sides on which the head and element may be moved and then locked in position. The combination may be used to set the height of a table saw blade or dado blade, to set position of a rip fence of a table saw, by positioning the head on the same side of the base as the height/width gage element 16 with the first right angle side of the height/width gage element in parallel relation with the right angle side of the square head, the mentioned parallel sides may be used as vernier "calipers" to measure diameters and thickness, by placing the right angle side of the square head, on the same plane as the end of the base, against a table surface, for example, the first right angle side of the height/width gage element can be moved a required number of inches and then utilized to scribe a work piece which is positioned on the table in spaced parallel relation to the base, and finally this latter assembly can also be utilized to set the drill depth on a drill press.

BRIEF DESCRIPTION OF THE DRAWINGS

Further details are explained below with the help of the example(s) illustrated in the attached drawings in which:

FIG. 3 is a top plan view of the height/width gage element shown in FIG. 1;

FIG. 4 is a side elevational view of the height/width gage element shown in FIG. 3;

FIG. 5 is a bottom plan view of the height/width gage element shown in FIG. 2;

FIG. 6 is an end elevational view of the height/width gage element shown in FIG. 2; and FIG. 7 is a side elevational view of the locking part of the first locking stud according to the present invention.

DESCRIPTION OF THE PREFERRED EMBODIMENT(S)

Figures 1, 2:
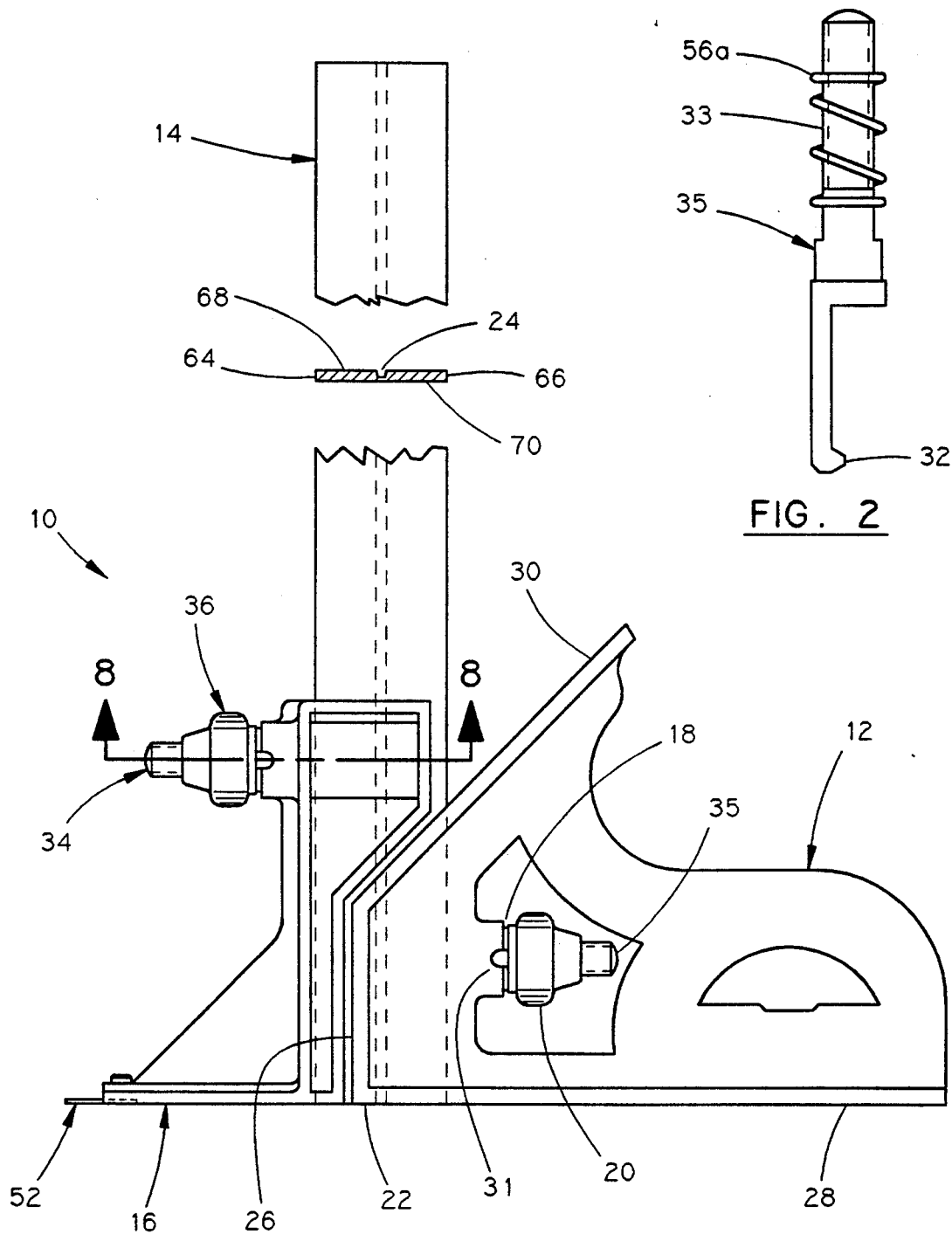
FIG. 1 is a side elevational view of the combination square height/width gage, according to the present invention.
FIG. 2 is a side elevational view of the head element, according to the present invention.

There is shown in the drawings a combination square height/width gage 10. The combination square height/width gage 10 comprises a square head or head portion 12, a base 14 and a height/width gage element 16.

The head portion 12 includes a first locking stud 18, a first stud locking nut 20 and a first engagement slot 22. The base 14 includes a longitudinally extending engagement groove 24. The head portion 12 has a polygonal configuration having bottom side 26 including a first short side edge 27a and a second short side edge 27b. A right angle side 28 extending integrally at 90 degrees from the first short edge 27a and an angle side 30 extending integrally from the second short edge 27b thereof and forming an angle greater than 90 degrees therewith. The first engagement slot 22 extends longitudinally through the bottom side 26 from the right angle side 28 to the angle side 30. The depth of the first engagement slot 22 is approximately 75% of the width of the base 14. A tubular first locking stud housing 31 is integrally positioned with the head portion 12 as shown in FIG. 1 communicating with the first engagement slot 22. The first locking stud 18 is partially located within the first locking stud housing 31 and includes a locking part 35 which has a terminal end extending beyond the first locking stud housing 31 into the first engagement slot 22 and includes a first locking stud shoulder 32 for a purpose to be setforth hereinafter. The terminal end 33 of the locking part 35 of the first locking stud 18 remote from the first locking stud shoulder 32 is externally threaded and extends above the first locking stud housing 31. The terminal end 33 of the first locking stud 18 is circumscribed by a first spring 56a prior to its engagement by the first stud locking nut 20.

The height/width gage element 16 includes a second locking stud 34, a second stud locking nut 36 and a second engagement slot 38. The height/width gage element 16 comprises a polygonal configuration having a lower side 40 with a first right angle side 42 extending integrally at 90 degrees from one short edge 43a therefrom and a first angle side 44 extending integrally from the other short edge 43b thereof and forming an angle greater than 90 degrees therewith. The other short edge, of the first angle side 44, spaced from the juncture with the lower side 40, has a second lower side 46 extending therefrom in spaced parallel relationship with the extended plane of the lower side 40. The length of the second lower side 46 is approximately half as great as the length of the lower side 40. The second lower side 46 has a second right angle side 48 extending therefrom. The second right angle side 48 is in spaced parallel relation with the first right angle side 42. The second right angle side 48 is in integral right angle relation with a platform portion 50. The platform portion 50 is in spaced parallel relation with the second lower side 46, the lower side 40 and the second engagement slot 38. The platform portion 50 extends from its juncture with the second right angle side 48 to its juncture with the first right angle side 42. The first right angle side 42 extends above the horizontal plane of the platform portion 50 and has a scribe means 52 attached adjacent its free terminal end. The scribe means 52 may be a metal isosceles triangle having one apex extending above the free terminal end of the first right angle side 42 as shown in FIG. 6. The second engagement slot 38 extends from the first right angle side 42 through the lower side 40, the first angle side 44, the second lower side 46 and finally through the second right angle side 48. An aperture 54 is formed in right angle relation with and through the platform portion 50 in close proximity to its juncture with the second right angle side 48. The aperture 54 forms a tubular channel that opens into the second engagement slot 38.

The second locking stud 34 is partially located within the channel provided by the aperture 54 and includes a locking part 35a having a terminal end which extends beyond the said channel into the second engagement slot 38 and includes a second locking stud shoulder 58 for a purpose to be setforth hereinafter. The free terminal end 60 of the second locking stud 34 remote from the second locking stud shoulder 58 is externally threaded, extends above the aperture 54 and is circumscribed by a helical spring 62 prior to its engagement by the second stud locking nut 36.

The base 14 is a ruler, rectangular in configuration, including a first long side edge 64, a second long side edge 66, a first side 68 and a second side 70. The first side 68 has the longitudinal engagement groove 24 formed thereon extending the full length of the first side 68. The first and second long side edges 64, 66 are in spaced parallel relation with each other and connected at their "ends" to define the rectangular configuration. The first side 68 may be divided into units of length in the U.S. Customary system and the second side 70 may be divided into units of length in the metric system.

To engage the head portion 12 with the base 14, the first stud locking nut 20 not being locked, the base 14 is inserted into the first engagement slot 22. The longitudinal engagement groove 24 is placed facing the first locking stud shoulder 32 of the first locking stud 18 and because of the dimensional relationship between the longitudinal engagement groove 24 and the first locking stud 18, the first locking stud shoulder 32 is positioned within the longitudinal engagement groove 24. The head portion 12 and its first locking stud 18 can now be moved longitudinal along the base 14 to a desired point on the base 14. The head portion 12 is locked to the base 14 by rotating the first locking stud 18 in a clockwise direction.

To engage the height/width gage element 16 and the base 14, with the second stud locking nut 36, the second stud locking nut 36 not being locked, the base 14 is inserted into the second engagement slot 38 of the height/width gage element 16 on the opposite side of the base 14 from that engaged by the head portion 12. The first angle side 44 is positioned so that the height/width gage element 16 can be moved to place the first angle side 44 in spaced parallel relation with the angle side 30 of the head portion 12. The longitudinal engagement groove 24 is positioned to face the second locking stud shoulder 58 of the second locking stud 34 and because of the dimensional relationship of the longitudinal engagement groove 24 and the second locking stud 36, the second locking stud shoulder 58 is placed within the longitudinal engagement groove 24. The height/width gage element 16 along with the second locking stud shoulder 58 of the locking part 35a of the second locking stud 34 can now be moved longitudinally along the base 14 to a desired point on the base 14. The height/width gage element 16 can then be locked to the base 14 by rotating the second locking stud 34 in a clockwise direction.

By placing the end of the base 14 against the surface of the table of a table saw, the first right angle side 42 of the height/width gage element 16 may be used to set the height of a table saw blade or dado blade. The position of a rip fence of a table saw may be set by placing the first right angle side 42 of the height/width gage element 16 at the saw blade and then moving the base 14 the required number of inches and utilizing the right angle side 28 of the head portion 12, set on the same plane as the end of the base 14, to position the rip fence against the right angle side 28. By positioning the head portion 12 on the same side of the base 14 as the height/width gage element 16 with the first right angle side 42 of the height/width gage element 16 in parallel relation with the right angle side 28 of the head portion 12, the mentioned parallel sides may be used as vernier "calipers" to measure diameters and thicknesses. By placing the right angle side 28 of the head portion 12 on the same plane as the end of the base 14 against a table surface, for example, the first right angle side 42 of the height/width gage element 16 can be moved a required number of inches and then utilized to scribe a work piece which is positioned on the table in spaced parallel relation to the base 14. This latter assembly can also be utilized to set the drill depth on a drill press.

What I claim is:

1. The combination of a height/width gage element and an adjustable square, the square comprising a base and a head portion, the base being rectangular in configuration, having a side surface and first and second long side edges, an engagement slot formed on said side surface extending longitudinally thereon, the head portion having a first engagement slot formed therein, a first locking means attached thereto, the head portion movably engaging the base, the head portion further having a bottom side, the bottom side including a first short side edge and a second short side edge, a right angle side extending integrally from the first short edge thereof and an angle side extending integrally from the second short edge thereof and forming an angle greater than 90 degrees therewith, the height/width gage element having a second engagement slot formed therein, a second locking means attached thereto, the heighty width gage element movably engaging the base and including a lower side, the lower side having a front side edge and a back side edge, the lower side having a first right angle side extending integrally at 90 degrees from the front side edge and a first angle side extending integrally from the back side edge and forming an angle greater than 90 degrees therewith, the head portion engaged to the base with the bottom side in parallel relation with the base, the angle side being in angular relation to the base, and the base engagement slot engaged by the height/width gage element, the lower side of the height/width gage element positioned in parallel relation with the bottom side of the head portion, the first and second locking means engaging the base, the first angle side of the height/width gage element being in spaced parallel relation to the angle side of the head portion and lower side of the height/width gage element being in spaced parallel relation to the bottom side of the head portion such that when the head portion and the height/width gage element are slid together along the base portion, the first angle side and lower side of the height/width gage element abut the angle side and the bottom side of the head portion.

* * * * *